(12) United States Patent
Picard et al.

(10) Patent No.: US 11,726,995 B2
(45) Date of Patent: Aug. 15, 2023

(54) SYSTEM AND METHOD FOR VALUE PACK GENERATION USING GENERIC SQL PLUGIN FOR UNIFIED CONSOLE

(71) Applicant: HEWLETT PACKARD ENTERPRISE DEVELOPMENT LP, Houston, TX (US)

(72) Inventors: Jean-Charles Picard, Grasse (FR); Violette Heron, Mougins (FR); Jean Michel Dias Vaz, Mougins (FR)

(73) Assignee: Hewlett Packard Enterprise Development LP, Spring, TX (US)

(*) Notice: Subject to any disclaimer, the term of this patent is extended or adjusted under 35 U.S.C. 154(b) by 35 days.

(21) Appl. No.: 16/811,895

(22) Filed: Mar. 6, 2020

(65) Prior Publication Data
US 2021/0182280 A1 Jun. 17, 2021

(30) Foreign Application Priority Data
Dec. 17, 2019 (EP) .................................. 19306670

(51) Int. Cl.
*G06F 16/00* (2019.01)
*G06F 16/242* (2019.01)
*G06F 16/22* (2019.01)

(52) U.S. Cl.
CPC ........ *G06F 16/244* (2019.01); *G06F 16/2282* (2019.01); *G06F 16/2428* (2019.01)

(58) Field of Classification Search
None
See application file for complete search history.

(56) References Cited

U.S. PATENT DOCUMENTS

| | | |
|---|---|---|
| 6,366,916 B1 | 4/2002 | Baer et al. |
| 6,917,939 B1 | 7/2005 | Baer et al. |
| 7,392,255 B1 | 6/2008 | Sholtis et al. |
| 7,606,813 B1 | 10/2009 | Gritsay et al. |

(Continued)

FOREIGN PATENT DOCUMENTS

| | | |
|---|---|---|
| EP | 2381629 A1 | 10/2011 |
| EP | 3015984 A1 | 5/2016 |
| WO | 2006/026673 A2 | 3/2006 |

OTHER PUBLICATIONS

Extended European Search Report received in EP Application No. 14306728.8, dated Apr. 29, 2015, 6 pages.

(Continued)

*Primary Examiner* — Augustine K. Obisesan
(74) *Attorney, Agent, or Firm* — Sheppard Mullin Richter & Hampton LLP

(57) ABSTRACT

Systems and methods of automating the generation of a logical model defining one or more tables of a data source are provided. The logical model definitions of the tables can be exposed to a platform that can access and obtain data from multiple heterogeneous data sources based on a unified and normalized format. Tables of a data source can be analyzed to determine key characteristics, and based on the key characteristics, converted into dimension and fact table representations, objects, and operations that comport with the unified and normalized format. Default rules for generating the dimension and fact table representations, objects, and operations can be followed, or user-defined customizations can be implemented.

20 Claims, 12 Drawing Sheets

(56) References Cited

U.S. PATENT DOCUMENTS

| | | |
|---|---|---|
| 7,702,636 B1 | 4/2010 | Sholtis et al. |
| 7,711,750 B1 | 5/2010 | Dutta et al. |
| 7,882,122 B2 | 2/2011 | Wong |
| 8,214,409 B2 | 7/2012 | O'Farrell et al. |
| 8,224,873 B1 | 7/2012 | Korablev et al. |
| 8,301,720 B1 | 10/2012 | Thakker et al. |
| 8,560,366 B2 | 10/2013 | Mikurak |
| 8,566,732 B2 | 10/2013 | Louch et al. |
| 8,745,096 B1 | 6/2014 | Noble et al. |
| 8,838,636 B2 | 9/2014 | Kulkarni et al. |
| 8,965,987 B2 | 2/2015 | Lehmann et al. |
| 9,075,788 B1 | 7/2015 | Roth et al. |
| 10,275,475 B2 | 4/2019 | Tsirogiannis et al. |
| 10,599,642 B1* | 3/2020 | Hawes .................. G06F 16/244 |
| 2002/0035593 A1 | 3/2002 | Salim et al. |
| 2002/0091702 A1 | 7/2002 | Mullins |
| 2002/0116453 A1 | 8/2002 | Todorov et al. |
| 2002/0175955 A1 | 11/2002 | Gourdol et al. |
| 2003/0061207 A1* | 3/2003 | Spektor .............. G06F 16/2445 |
| 2003/0097485 A1 | 5/2003 | Horvitz et al. |
| 2003/0110167 A1 | 6/2003 | Kim |
| 2003/0226102 A1 | 12/2003 | Allor |
| 2004/0068728 A1 | 4/2004 | Blevins |
| 2004/0122977 A1 | 6/2004 | Moran et al. |
| 2004/0205452 A1 | 10/2004 | Fitzsimons et al. |
| 2005/0071803 A1 | 3/2005 | Cherdron et al. |
| 2005/0108206 A1 | 5/2005 | Lam et al. |
| 2005/0114487 A1 | 5/2005 | Peng et al. |
| 2005/0198561 A1 | 9/2005 | McAuley |
| 2005/0273758 A1 | 12/2005 | Long |
| 2006/0010394 A1 | 1/2006 | Chaudhri et al. |
| 2006/0069803 A1 | 3/2006 | Clark et al. |
| 2006/0080160 A1 | 4/2006 | Drumchian et al. |
| 2006/0112188 A1 | 5/2006 | Albanese et al. |
| 2006/0212846 A1 | 9/2006 | O'Farrell et al. |
| 2006/0248121 A1 | 11/2006 | Cacenco et al. |
| 2006/0265385 A1 | 11/2006 | Agrawal et al. |
| 2006/0265397 A1 | 11/2006 | Bryan et al. |
| 2007/0061371 A1 | 3/2007 | Bodin et al. |
| 2007/0094256 A1 | 4/2007 | Hite et al. |
| 2007/0192348 A1* | 8/2007 | Brodersen ............... G06F 16/86 707/999.102 |
| 2007/0209006 A1 | 9/2007 | Arthurs et al. |
| 2007/0214454 A1 | 9/2007 | Edwards et al. |
| 2007/0294307 A1* | 12/2007 | Chen ...................... G06F 16/22 |
| 2008/0010253 A1* | 1/2008 | Sidhu .................. G06F 16/2428 |
| 2008/0071796 A1 | 3/2008 | Ghuneim et al. |
| 2008/0104080 A1 | 5/2008 | Copeland et al. |
| 2008/0114770 A1 | 5/2008 | Chen et al. |
| 2008/0155555 A1 | 6/2008 | Kwong |
| 2008/0163078 A1 | 7/2008 | Van et al. |
| 2008/0228521 A1 | 9/2008 | Wilmering et al. |
| 2008/0229274 A1 | 9/2008 | Cacenco et al. |
| 2008/0294712 A1 | 11/2008 | Lu et al. |
| 2008/0294854 A1* | 11/2008 | Schneider ............. G06F 3/0683 711/E12.002 |
| 2008/0295074 A1* | 11/2008 | Schneider ................ G06F 8/71 717/120 |
| 2009/0037391 A1 | 2/2009 | Agrawal et al. |
| 2009/0063573 A1 | 3/2009 | Takemoto |
| 2009/0119672 A1 | 5/2009 | Bussard et al. |
| 2009/0282369 A1 | 11/2009 | Jones |
| 2009/0282423 A1 | 11/2009 | Smith et al. |
| 2009/0287772 A1 | 11/2009 | Stone et al. |
| 2009/0319548 A1 | 12/2009 | Brown et al. |
| 2010/0005168 A1 | 1/2010 | Williams et al. |
| 2010/0023874 A1 | 1/2010 | Frohwein |
| 2010/0138295 A1 | 6/2010 | Caron et al. |
| 2010/0169351 A1 | 7/2010 | Kulkarni et al. |
| 2010/0325217 A1 | 12/2010 | Mody et al. |
| 2011/0041144 A1 | 2/2011 | Araki |
| 2011/0099487 A1 | 4/2011 | Pyhalammi et al. |
| 2011/0125854 A1 | 5/2011 | Macken |
| 2011/0126134 A1 | 5/2011 | Macken |
| 2011/0131504 A1 | 6/2011 | Shustef |
| 2011/0154226 A1 | 6/2011 | Guertler et al. |
| 2012/0030573 A1 | 2/2012 | Balko et al. |
| 2012/0059840 A1 | 3/2012 | Reddy et al. |
| 2012/0124024 A1 | 5/2012 | Vaughan et al. |
| 2012/0239639 A1 | 9/2012 | Shriber et al. |
| 2012/0310899 A1 | 12/2012 | Wasserman et al. |
| 2012/0323933 A1 | 12/2012 | He et al. |
| 2012/0330929 A1 | 12/2012 | Kowalski et al. |
| 2013/0019195 A1 | 1/2013 | Gates |
| 2013/0145361 A1 | 6/2013 | Kaegi |
| 2013/0187926 A1 | 7/2013 | Silverstein et al. |
| 2013/0191526 A1 | 7/2013 | Zhao |
| 2013/0268520 A1 | 10/2013 | Fisher et al. |
| 2014/0089786 A1 | 3/2014 | Hashmi |
| 2014/0157351 A1 | 6/2014 | Canning et al. |
| 2014/0172885 A1 | 6/2014 | Sekharan |
| 2014/0214967 A1 | 7/2014 | Baba et al. |
| 2014/0244766 A1 | 8/2014 | Mo et al. |
| 2014/0279834 A1 | 9/2014 | Tsirogiannis et al. |
| 2014/0280043 A1 | 9/2014 | Griffin et al. |
| 2014/0282453 A1* | 9/2014 | O'Rourke ........... G06F 11/3624 717/154 |
| 2015/0026356 A1 | 1/2015 | Kaplinger et al. |
| 2015/0058868 A1 | 2/2015 | Padinjarel et al. |
| 2015/0169757 A1 | 6/2015 | Kalantzis et al. |
| 2015/0199239 A1 | 7/2015 | Prahlad et al. |
| 2015/0212989 A1 | 7/2015 | Rice |
| 2015/0213723 A1 | 7/2015 | Vattikonda et al. |
| 2015/0242528 A1 | 8/2015 | Buehler et al. |
| 2015/0347542 A1 | 12/2015 | Sullivan et al. |
| 2016/0063060 A1 | 3/2016 | Nguyen et al. |
| 2016/0086241 A1 | 3/2016 | Proulx |
| 2016/0094612 A1 | 3/2016 | Lockhart et al. |
| 2016/0098449 A1 | 4/2016 | Park et al. |
| 2016/0103559 A1 | 4/2016 | Maheshwari et al. |
| 2016/0103750 A1 | 4/2016 | Cooper et al. |
| 2016/0103888 A1 | 4/2016 | Fletcher et al. |
| 2016/0103908 A1 | 4/2016 | Fletcher et al. |
| 2016/0105338 A1 | 4/2016 | Fletcher et al. |
| 2016/0110443 A1 | 4/2016 | Slovacek |
| 2016/0164949 A1 | 6/2016 | Grimstrup et al. |
| 2016/0366036 A1 | 12/2016 | Gupta et al. |
| 2017/0046127 A1 | 2/2017 | Fletcher et al. |
| 2017/0046374 A1 | 2/2017 | Fletcher et al. |
| 2017/0083165 A1 | 3/2017 | Ali et al. |
| 2017/0147310 A1* | 5/2017 | Bregler .................. G06F 16/21 |
| 2017/0220611 A1 | 8/2017 | Yang et al. |
| 2018/0109936 A1 | 4/2018 | Ting et al. |
| 2018/0189370 A1* | 7/2018 | Bendel ................ G06F 16/2282 |
| 2020/0379781 A1* | 12/2020 | Rachapudi ................ G06F 8/30 |

OTHER PUBLICATIONS

Extended European Search Report., EP Application No. 17199493.2, dated Apr. 4, 2018, pp. 1-9, EPO.

International Search Report & Written Opinion received in PCT Application No. PCT/US2015/022486, dated Jul. 28, 2015, 11 pages.

Knex.Js, "A SQL Query Builder for Javascript", available online at <https://web.archive.org/web/20190820201744/https://knexjs.org/>, Aug. 20, 2019, 60 pages.

Kovachev, D. et al., "Direwolf—Distributing and Migrating User Interfaces for Widget-based Web Application," (Research Paper), Proceedings of Springer Berlin Heidelberg, Jul. 8-12, 2013, pp. 99-113, vol. 7977.

Symantec Corporation, "E-Security Begins with Sound Security Policies," Jun. 14, 2001, pp. 1-23.

Walsh, T. et al., "Collection Manager: Integrating Diverse Data Sources On The Grid", MCNC Research and Development Institute, 2004, 10 pages.

\* cited by examiner

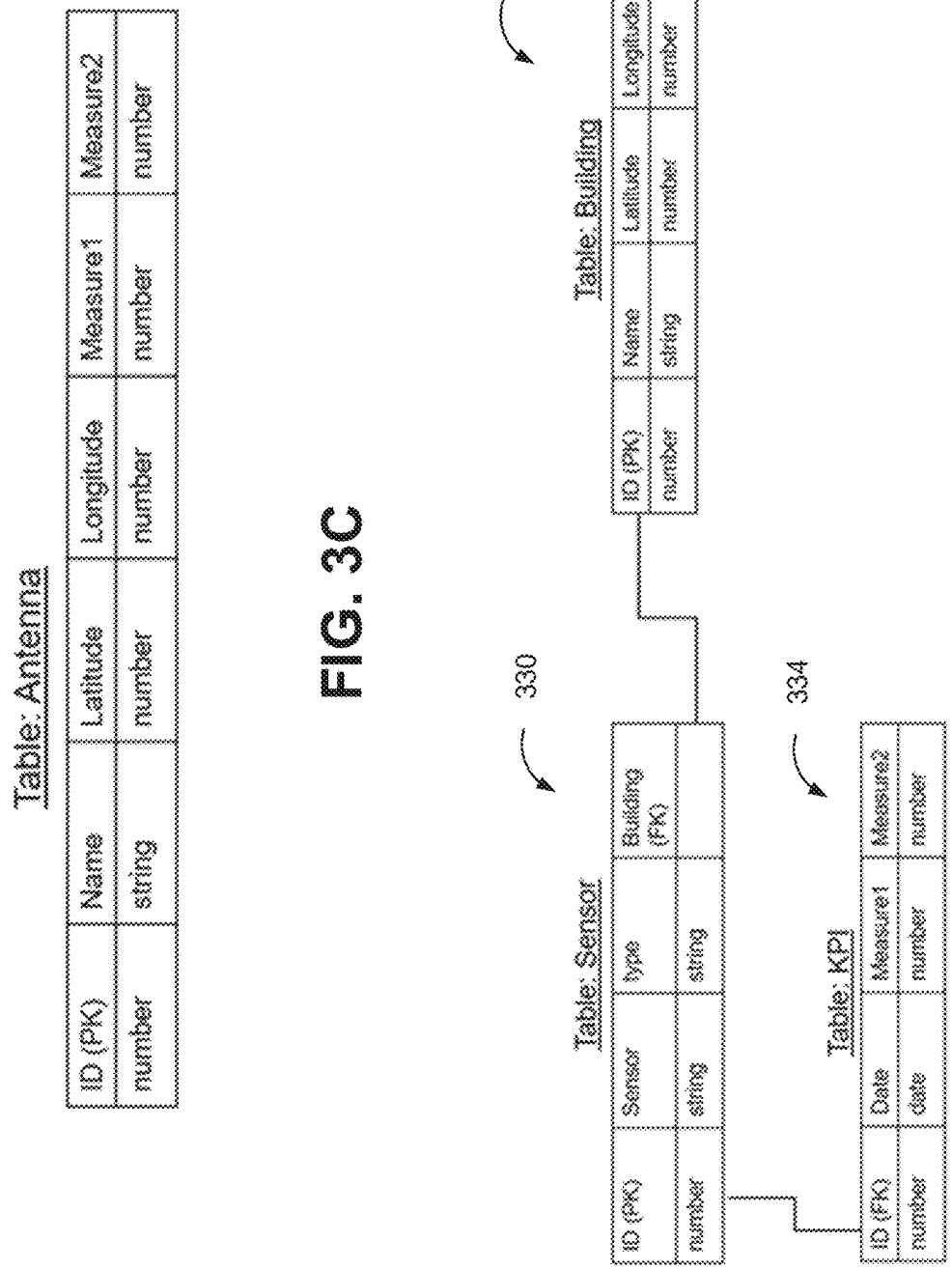

SYSTEM AND METHOD FOR VALUE PACK GENERATION USING GENERIC SQL PLUGIN FOR UNIFIED CONSOLE

DESCRIPTION OF RELATED ART

Reporting and other forms of providing data regarding/from computer systems can be an important function for a business, e.g., to help ensure that the business is operating in a desired manner. One manner of providing data from a computer system may occur via user interfaces such as Graphical User Interfaces (GUIs), which have become an accepted way of interacting with computer systems. As an example, GUIs may be used to present certain data, metrics, and/or other information regarding a business' operations, such as the operations of a communications service provider (CSP).

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIGS. 3A, 3B, 3C, and 3D illustrate example generation and customization operations performed on SQL database tables in accordance with one embodiment of the present disclosure.

Figure 1:
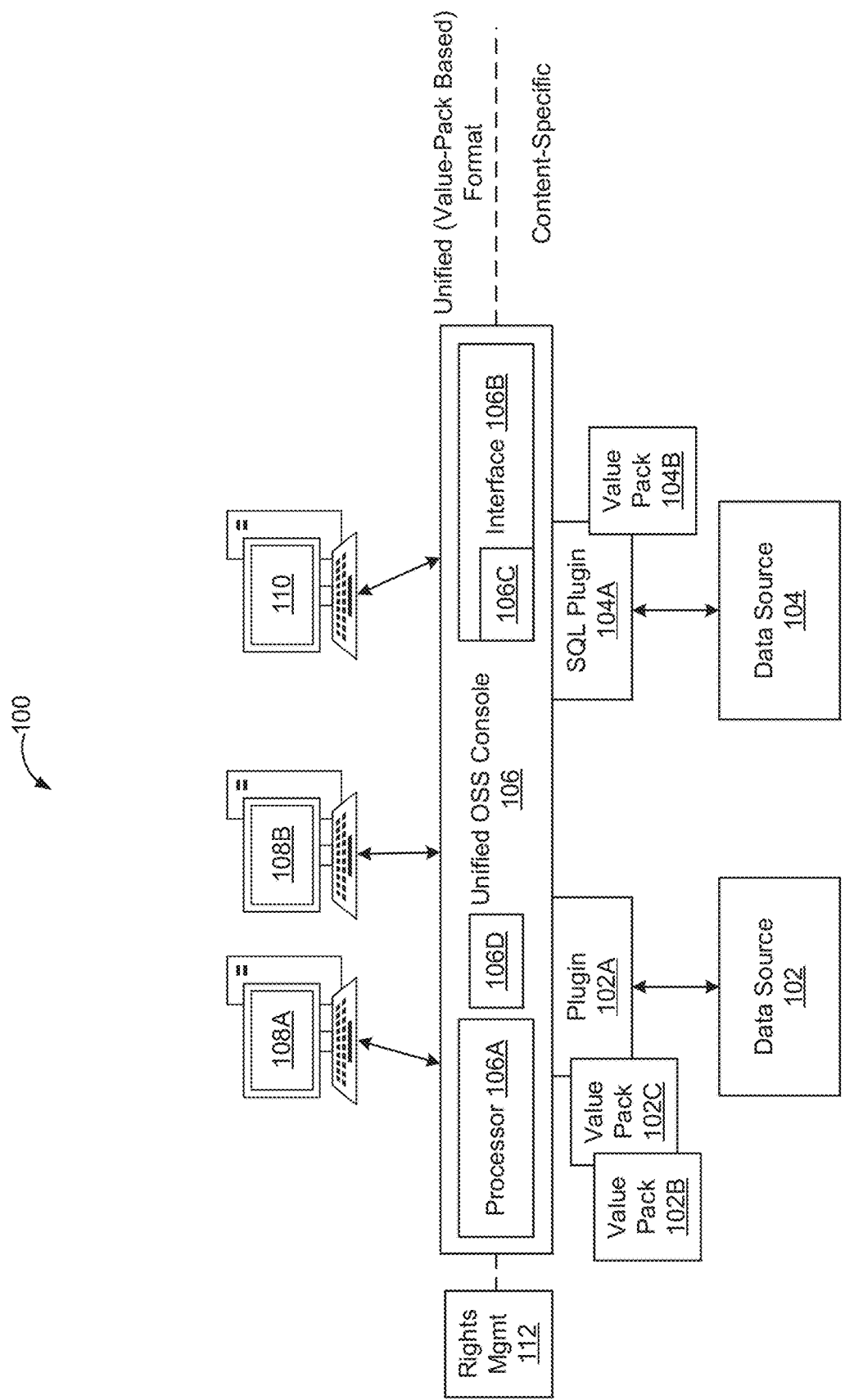
FIG. 1 is a block diagram of a unified OSS console platform.

The figures are not exhaustive and do not limit the present disclosure to the precise form disclosed.

DETAILED DESCRIPTION

The operation of a business may involve accessing various data sources from which information may be gleaned, used, etc. Increased flexibility can be achieved if a common framework provides access to multiple data sources. Such a capability for defining a modular architecture in which modules can be added or removed from the framework to extend or change the accessible data sources forms the foundation of the present disclosure.

Providing access to a data source is a common requirement even in small computing devices and systems. Data sources may include event logs in PCs and servers, consumable usage data of printers, databases, etc. In larger or enterprise-size computing systems, most systems are likely to be, or form part of, a data source. For example, an enterprise computing system may include Quality of Service (QoS) and other monitoring systems that produce data that can be accessed. It may include one or more of management systems, accounting systems, control systems, messaging systems, firewall and security systems, and other event management systems that may also be or may also include data sources. Measurement systems such as probes or networks of probes are also examples of data sources that may exist within a computing system.

As will be described in greater detail below, providing access to one or more data sources can be accomplished through a console that can provide access to information/data maintained in such data sources using a unified (and normalized) format. It should be understood that in the context of various embodiments of the present disclosure, a unified format can refer to a format that allows for the management of any type(s) or kind(s) of data without the need for a pre-defined semantic schema. The unified format can be normalized in terms of dimension (criteria) and fact (metrics) regardless of the source of the subject data. For example, such a console may provide various tools/products (within a single web-based GUI framework) for presenting data, metrics, and/or other information regarding a business' operations, such as a CSP. One aspect of such a console is a dashboard engine capable of providing information regarding, e.g., health, performance, and availability of a business' services, networks, and/or applications.

In some embodiments, the web GUI framework is value pack/package-driven, and extensible to address visualization and analysis views for multiple, heterogeneous domain servers including a CSP's servers, e.g., data servers or databases. In this context, a logical model definition described in JavaScript Object Notation (JSON) can be packaged as a value pack/package, which may then be exposed to a front end web GUI application. Presenting the aforementioned information can be accomplished through a unified presentation layer, and a CSP's servers can be integrated into a generic GUI framework based on plugin components.

Currently, integrating a SQL data server requires building a plugin component, such as a data source adapter or connector, that may take upwards of a week to develop. Moreover, any data shared with the GUI must be defined in/as a value pack. Accordingly, various embodiments of the present disclosure are directed to automating (and reducing the time needed to) generate a value pack for an SQL database for integration into or with a console by way of an SQL plugin. Initially, the SQL plugin may be a generic SQL plugin. Upon interacting with a corresponding data source, and defining/modeling the data stored therein as a value pack, the SQL plugin will become specifically adapted to the data source. It should be noted that the disclosed technology can be adapted to work with other types of relational databases as well.

FIG. 1 is a block diagram of an example computing system 100 in which various embodiments of the present disclosure may be implemented and/or may make use of various embodiments of the present disclosure. Computing system 100 may include particular components, elements, etc. according to various examples. However, in different examples, more, fewer, and/or other components, elements, arrangements of components/elements, etc. may be used according to the teachings described herein. In addition, various components, elements, etc. described herein may be implemented as one or more electronic circuits, software components or engines, hardware components, consoles, special purpose hardware (e.g., application specific hardware, application specific integrated circuits (ASICs), embedded controllers hardwired circuitry, Field Programmable Gate Arrays (FPGA), etc.), or some combination of these.

As shown in FIG. 1, in one example, computing system 100 includes a plurality of plugins 102A, 104A. Each plugin 102A, 104A may be associated with a remote data source, in this example, data servers 102 and 104, respectively, and encode computer program code to access the remote data source. In one example, at least one processor 106A executes computer program code to provide an intermediate framework 106 (also referred to as a unified OSS console) to receive and execute the plurality of plugins 102A, 104A, to access each remote data source 102, 104, which may be data servers, databases, or other data repositories, and to obtain information on data available from each remote data source. In one example, a console, such as unified OSS console 106 may comprise software executed on a processor, e.g., processor 106A, enabling access to any data source, product, business operation, etc.

In one example, computing system 100 further comprises a unified interface 106B to receive a request(s) regarding the aforementioned information and to retrieve data corresponding to the request(s) by accessing the remote data source corresponding to the information using the associated plugin 102A (corresponding to data source 102), 104A (corresponding to data source 104).

In one example, remote data may be heterogeneous. For example, data sources 102 and 104 may store and/or provide differently formatted data, different types of data and/or have different access mechanisms. For example, one data source, e.g., data source 102, may be accessible via a representational state transfer (REST) type application programming interface (API) while another, e.g., data source 104, may be accessed via a simple object access protocol (SOAP) API. Other access mechanisms may also be utilized including the transfer of data via files or a database connection such as via an open database connectivity (ODBC) link.

In one example, as alluded to above, each plugin 102A, 104A encodes computer program code to access an API, link or other mechanism to communicate with its respective remote data source 102, 104. For example, plugin 102A may communicate via different REST APIs with its respective data source 102 (which may be a relational database, for example), while plugin 104A, which may be an SQL plugin, may communicate via a SOAP API with its data source, data server 104 (which may be an SQL type relational database).

As noted above, in one example, unified OSS console 106 provides a unified interface 106B for receiving requests for information. Such requests may originate at one or more client computing devices. Accordingly, unified interface 106B is made to be accessible to client computing devices 108A, 108B for accessing remote data sources 102 and 104. In one example, unified interface 106B includes a router 106C to receive a request from a client computing device, such as computing device 108A. In some embodiments, each of computing devices 108A and 108B may be a locally or remotely located computer, server, workstation, mobile device, or other computing device. Each of computing devices 108A and 108B may be used by a user(s), such as an administrator, operator, or other business personnel to access and interact with data sources 102, 104 via unified OSS console 106. Router 106C may route a request from, e.g., computing device 108A, to one of the plugins 102A, 104A depending on the subject(s) of the request, for example.

In one example, the unified OSS console 106 publishes information obtained from, or information on, (queryable) data available from a remote data source(s) 102, 104, and maintains a link between the published information and the respective plugin 102A, 104A from which it is made available. For example, the link may be maintained via a look-up table, encoded in a predetermined labelling format of the published information, or maintained in some other way. In one example, the requests from client computing devices 108A, 108B refer to the published information, wherein router 106C cross-references the published information with the request and with the links to determine the appropriate plugin 102A, 104A to access/utilize to respond to the requests. It should be understood that in the context of various embodiments, information can refer to metadata or metadata-like elements, e.g., lists of dimensions, facts, relationships between dimensions and facts, etc. Such information can help define a query in order to obtain the desired data from a data source. Data can refer to elements, e.g., collected values, metrics, from computing system 100, one or more of data sources 102, 104, etc.

Figure 6A:
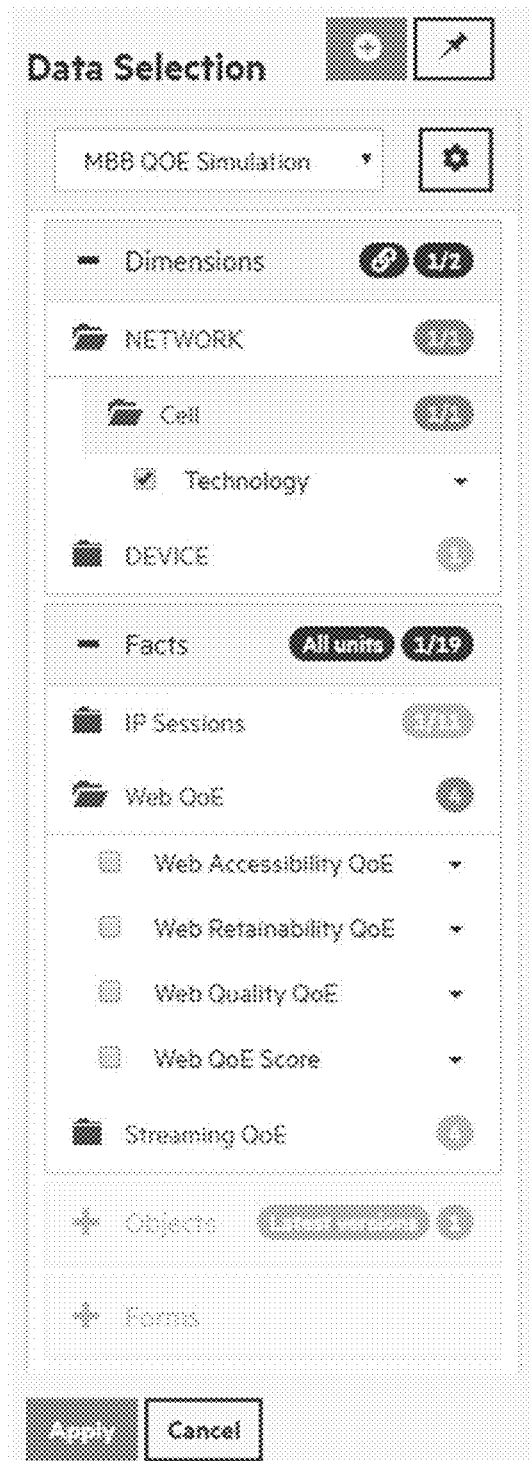
FIG. 6A is an example representation of data selection GUI in accordance with one embodiment of the present disclosure.

In one example, unified OSS console 106 includes a data repository (not shown) of user interface elements, wherein unified interface 106B may include at least one of its own processors (or may leverage processor 106A) to execute computer program code stored on memory unit 106D to access the data repository of user interface elements to output retrieved data. For example, user interface elements are selected from a set including a visual layout of a user interface to output the retrieved data and a visual representation to be used to output the retrieved data. FIG. 6A, described in greater detail below, may be an example of a data selection GUI in accordance with one example. In one example, a visual layout may be a workspace or a view. In one example, a workspace includes a number of views, the visible view being selectable via a control such as a tabbed display, button, drop-down box or radio box. In one example, a view is a layout of widgets and/or other user interface elements. In one example, a widget is a graphical display element that can be used to display retrieved data, for example in a graph, list or other format. FIG. 6C, described in greater detail below, illustrates examples of one or more of the above-mentioned views, layouts, widgets, user interface elements, etc.

A GUI editor/graphical design computing component 110 may be used by a user(s) to customize the presentation of information/data via one or more of the aforementioned mechanisms, e.g., widgets, displays, buttons, drop-down boxes, etc. GUI editor 110 may be a what-you-see-is-what-you-get (WYSIWYG) graphical editor that an end user may interact with to, e.g. add components, modify existing screens, apply a different layout to information/data that is presented, etc. GUI editor 110 may generate the JSON defining a screen, and capture customer operations and/or queries. It should be understood that use of GUI edit 110 can speed up the development of new screens, the application of changes requested by a user, e.g., a product integration and delivery team, etc.

In one example, user interface elements are defined by a plugin, e.g., plugin 102A, so as to be available for displaying data retrieved from the plugin's respective data source 102. In one example, user interface elements are defined at data source 102 and communicated to unified OSS console via its respective plugin 102A. In one example, unified OSS console 106 accesses remote data source 102 via the respective plugin 102A and, upon determining a change in the definition of user interface elements at the data source 102, updates the data repository.

In one example, computing system 100 includes a rights management system 112. In one example, unified OSS console 106 may include at least one processor, e.g., processor 106A, to execute computer program code to access the rights management system 112 to determine a response to a received request. For example, the rights management system 112 may arbitrate security, authentication, auditing, logging and/or management of requests. In one example, the rights management system 112 provides a common security layer to the remote data sources 102, 104. In one example, security is premised on a role-based access control scheme.

In one example, computing system 100 may use value packs, e.g., value packs 102B, 102C to interface between a data source, e.g., data source 102 and unified OSS console 106 by way of plugin 102A. It should be understood that a value pack can refer to the semantic framework in which data from a data source can be exposed to unified OSS console 102A. In one example, the value pack 102B provides responses to requests from plugin 102A on behalf of the data source 102. In this way, data sources that cannot respond appropriately to requests from plugins at unified OSS console 106 can have a virtual data source adapter/value pack installed locally or at some point between the plugin and the data source to act as an emulator and/or translator thereby providing functionality that the data source cannot provide. Such value packs can provide some level(s) of abstraction between a data source and a resulting GUI through which information abstracted via one or more value packs can be presented. It should be understood that in some embodiments, more than one value pack can exist relative to a plugin, e.g., plugin 102A is associated with two value packs 102B, 102C, while SQL plugin 104A is associated with a single value pack 104B. It should be understood that the same data source or database in a data source can host several tables, dimensions, metrics, etc. For example, a database may store data for several domains, where a value pack can represent a standalone set of metadata for the each of the domains.

In one example, unified OSS console 106 may be hosted by a server having a processor to execute computer program code, a memory to store the plugins which are accessible and executable by the processor and a network interface to connect to one or more networks and enable communications to client computing devices and remote data sources. In one example, unified OSS console 106 is hosted by a number of servers forming a server farm.

It will be appreciated that unified OSS console 106 can provide access to data sources irrespective of where the data sources are hosted. In one example, one or more of the data sources are physically remote from the intermediate framework. In one example, one or more of the data sources are hosted on the same computing system as that on which unified OSS console 106 is hosted.

Figure 2A:
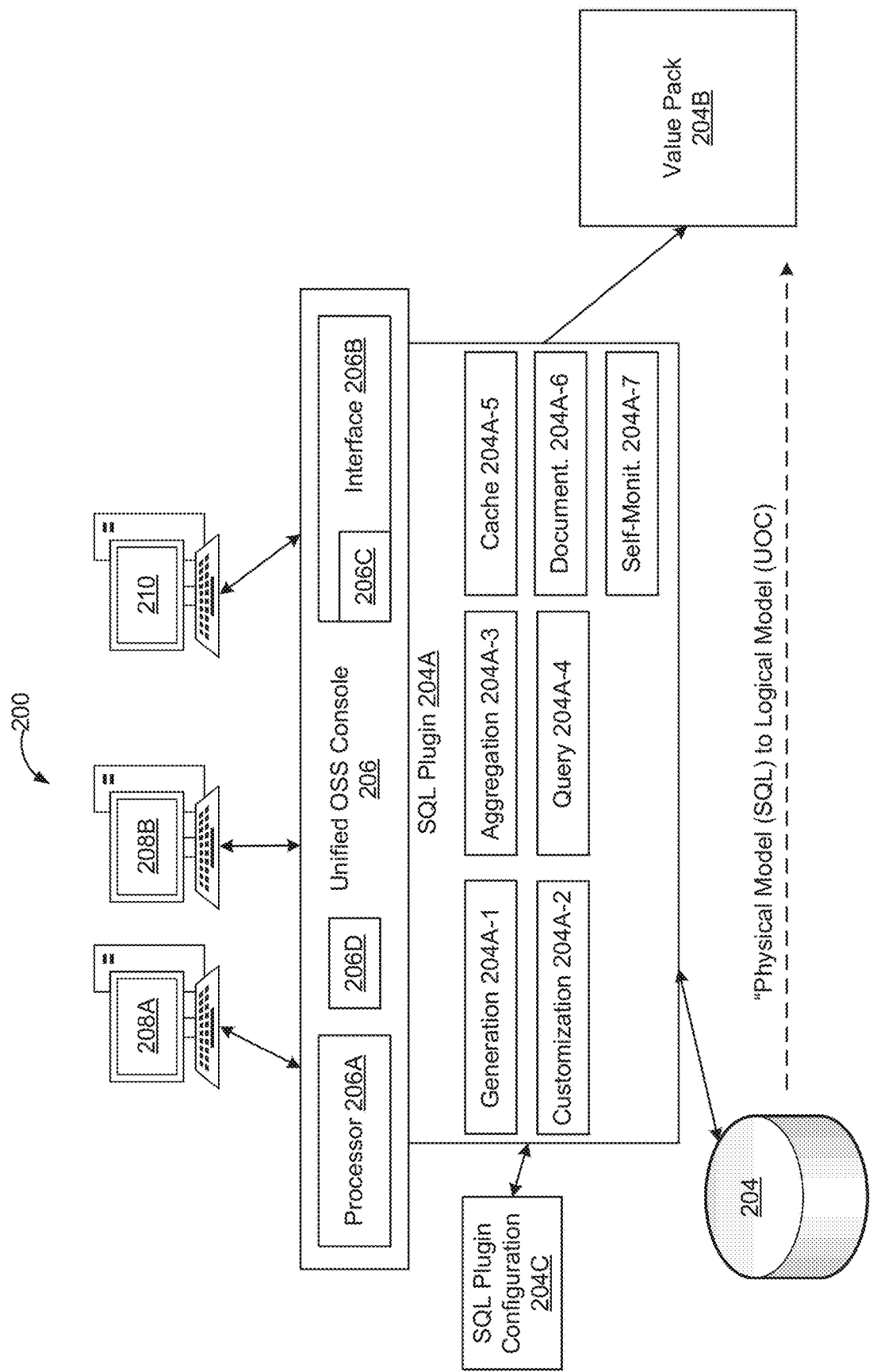
FIG. 2A is a block diagram of a generic SQL plugin operatively connected to the unified OSS console platform of FIG. 1 in accordance with one embodiment of the present disclosure.

FIG. 2A illustrates another example computing system 200, similar to computing system 100, e.g., also having a unified OSS console 206 (which may be one embodiment of unified OSS console 106. Like unified OSS console 106, unified OSS console 206 may comprise at least one processor 206A and a unified interface 206B, which may have a router 206C, each of which may operate in a manner that is the same as or similar to the manner in which processor 106A, unified interface 106B, and router 106C operate. Unified OSS console 206 may further comprise a memory unit 206D in which instructions executed by processor 206A may be stored.

Also, like computing system 100 of FIG. 1, computing system 200 may include one or more computing devices 208A and 208D through which requests for information/data accessible via SQL plugin 204A and maintained at a data source 204 can be sent, and through which such information/data may be presented. Data source 204, similar to data sources 102, 104 of FIG. 1, may be a database, a server maintaining data, or other data repository. As noted above, the presentation of information via a unified OSS console, such as unified OSS console 206, may leverage a value pack, in this example, value pack 204B. A value pack, such as value pack 204B, may comprise an abstraction between data source 204 and a GUI representation or presentation of information via computing devices 208A, 208B, and is a mechanism for interacting with and/or presenting heterogenous values representative of data in a normalized fashion. Moreover, the use of value packs allows a unified security model to be applied to data from heterogeneous data sources.

In order to generate such a value pack, automatically, SQL plugin 204A generates a value pack definition of one or more data tables maintained in data source 204, which may be an SQL relational database (although it should be noted that various embodiments disclosed herein can be adapted for use with any type of relational database). Thus, the description of various embodiments in the context of SQL/SQL type databases is merely exemplary, and not intended to be limiting in any way. In some embodiments, a value pack is a "packaged" logical model definition of a data table described/saved in a JSON format. It should be noted that conventional business intelligence (BI) tools may provide some form of access to data sources by importing database tables via an integrator, and adding links to a logical model through a GUI. However, BI tools do not generally automatically build such a logical layer from database tables. Automating the generation or building of the logical layer improves the efficiency of computing system 200 in terms of its ability to access and provide information to an end-user. Moreover, the data maintained in a data source can be "tuned" for use or exposure to the end-user. As used herein, tuning can refer to the customization of a value pack to expose a subset of available data to a user, e.g., end user, business admin, etc. It should be noted that the tuning of data can be performed as needed to drive value pack generation.

A plugin can refer to software that encapsulates a set of functions/features executable by a processor to effectuate those functions/features, and that acts as a channel over which a data source can be accessed. In particular, a plugin can manage one or more value packs that can represent different data, a different end audience, different access control, etc., while sharing the same protocol to access that data (e.g., via SQL, REST API, etc.). In this example, SQL plugin 204A may comprise one or more components embodying certain following functions/features including at least a generation component 204A-1. SQL plugin 204A may further comprise at least a customization component 204A-2, an aggregation component 204A-3, a query component 204A-4, a cache component 204A-5, a documentation component 204A-6, and a self-monitoring component 204A-7. SQL plugin 204A may be executed by processor 206A. At a high level, SQL plugin 204A when executed, analyzes or inspects all data sources, in this example, data source 204, and the data tables therein, and processes the data therein to automatically generate a logical model representative of each of the data tables. Moreover, SQL plugin 204A may customize the generation of data, e.g., refine the data to be generated through filtering, applying expressions, aggregate data from multiple data sources, etc.

Figure 2B:
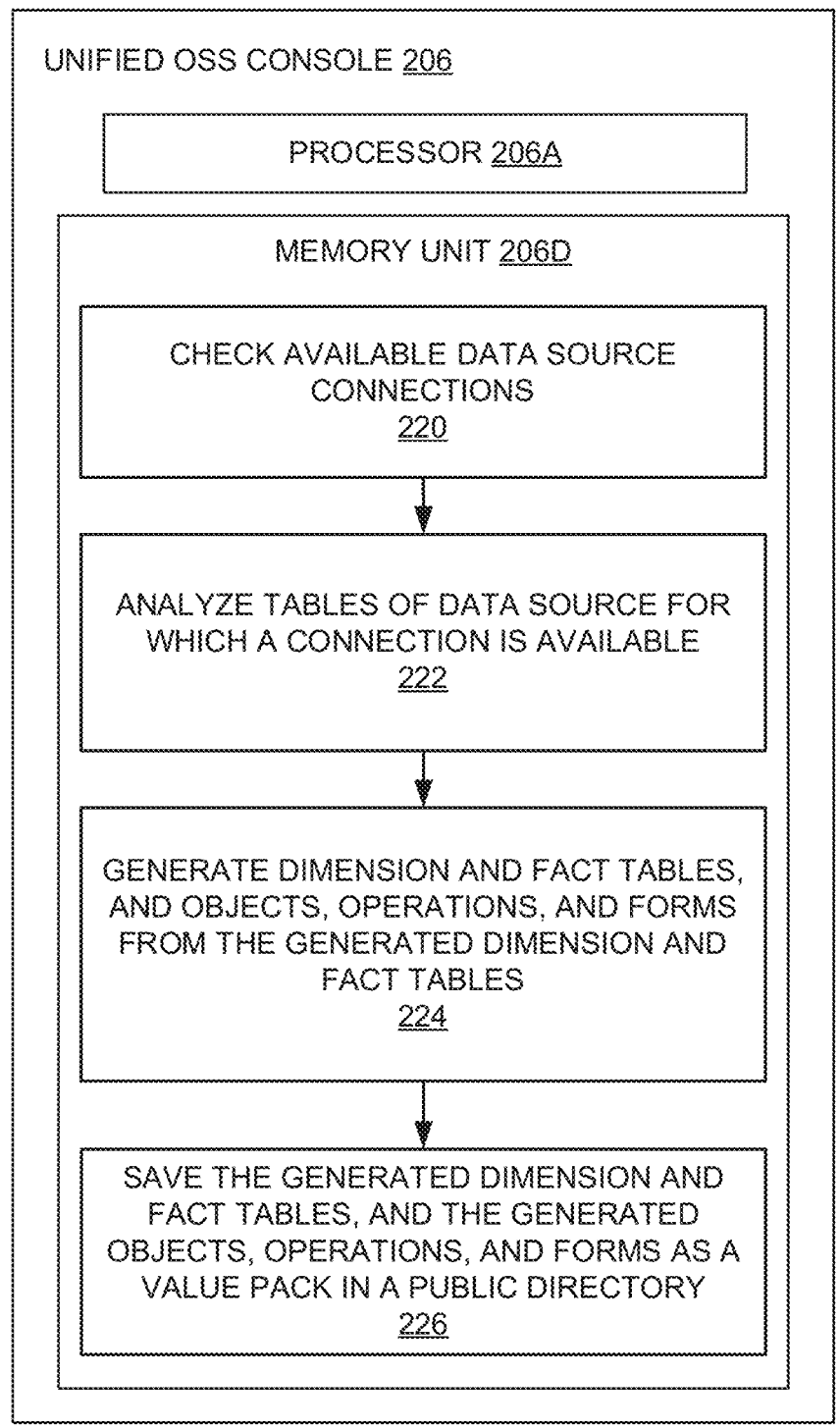
FIG. 2B is a flow chart illustrating example operations performed by the unified OSS console and SQL plugin of FIG. 2A to automatically generate a value pack definition of tables in a data source in accordance with one embodiment.

FIG. 2B is a flow chart illustrating example operations that may be performed by computing system 200, in particular, SQL plugin 204A (in conjunction with unified OSS console 206) in accordance with one embodiment. Unified OSS console 206, as discussed above, may be a computing component that includes a processor 206A and memory unit 206D. SQL plugin 204A comprises instructions (embodied as the aforementioned generation component 204A-1, customization component 204A-2, aggregation component 204A-3, query component 204A-4, cache component 204A-5, documentation component 204A-6, and self-monitoring component 204A-7) that may be performed by processor 206A.

Processor 206A may be one or more central processing units (CPUs), semiconductor-based microprocessors, and/or other hardware devices suitable for retrieval and execution of instructions stored in machine-readable storage medium, 206D. Processor 206A may fetch, decode, and execute instructions, such as instructions 220-226, to control processes or operations for automatically generating a value pack definition of a database table. As an alternative or in addition to retrieving and executing instructions, processor 206A may include one or more electronic circuits that include electronic components for performing the functionality of one or more instructions, such as a field programmable gate array (FPGA), application specific integrated circuit (ASIC), or other electronic circuits.

A machine-readable storage medium, such as memory unit (e.g., machine-readable storage medium) 206D, may be any electronic, magnetic, optical, or other physical storage device that contains or stores executable instructions. Thus, memory unit 206D may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 206D may be a non-transitory storage medium, where the term "non-transitory" does not encompass transitory propagating signals. As described in detail below, machine-readable storage medium 206D may be encoded with executable instructions, for example, instructions 220-226. Depending on the implementation, the instructions may include additional, fewer, or alternative instructions, and may be performed in various orders or in parallel.

Processor 206A may execute instruction 220 to check for available connections to any data sources operatively connected to unified OSS console 206. In the example of FIG. 2A, processor 206A checks for a connection to data source 204. That is, upon startup of unified OSS console 206, processor 206A checks SQL plugin configuration 204C to find connection/connection-related information, e.g., login, password, dialect, etc. That is, an end user may specify such connection/connection-related information for accessing a particular data source(s), wherein this information may be stored in a configuration file, embodied in this example, as SQL plugin configuration 204C. Upon connecting to data source 204 (using the connection/connection-related information found in SQL plugin configuration 204C, processor 206 may execute instruction 222 to analyze any tables of data source 204. As will be discussed below, analysis of tables may involve determining the existence of keys, e.g., primary, foreign, and/or composite keys, which can serve as a basis for generating logical models that are abstract and normalized/unified representations of the tables that can be used by unified OSS console 206 to generate views/present information regarding the data stored therein. In particular, dimension and fact tables are generated, along with objects, operations, and forms that in turn are generated based on the generated dimension and fact tables. At operation 226, the generation dimension and fact tables, as well as the generated objects, operations, and forms are saved as a value pack (in JSON format) in a public directory that can be accessed by unified OSS console 206. It should be noted that in some embodiments, generation of a value pack definition of a table can be forced. In this way, dashboard views, interactive GUIs, and generally, information/data presentation can be effectuated by unified OSS console 206 using the generated value pack(s). Thus, an end-user, e.g., admin, IT personnel, etc., may log into unified OSS console 206, browse value packs, and build GUIs using GUI editor/graphical design computing component 210.

In particular, generation component 204A-1, when executed, generates a value pack definition of SQL database tables, i.e., conforms SQL database tables to an abstraction understandable and useable by unified OSS console 206. In particular, generation component 204A-1 may effectuate dimension and fact modeling by analyzing an SQL database (embodied in this example by data source 204), and associating or categorizing each table of the SQL database with or as a dimension table, a fact table, or a combination of a dimension and fact table. This is accomplished based on primary and foreign/composite keys of each table.

It should be understood that a primary key can refer to a field in a table that uniquely identifies a row or record. Generally, each table of a database has one primary key, although the primary key can comprise one or more fields. When a primary key comprises multiple fields, the primary key can be referred to as a composite key. A foreign key can refer to a key used to link two (or more tables). That is, a foreign key may be a column or some combination of columns in one table whose value(s) match that associated with a primary key in another table.

For example, processor 206A executes instructions comprising generation component 204A-1 to access data source 204, which may be a SQL database, and analyze each table therein to determine the existence of each table's primary key. Upon discovering a table's primary key, the instructions comprising generation component 204A-1 can be executed to cause processor 206A to associate or categorize that table with or as a dimension table, with the table's columns comprising the table's dimension. If, upon analyzing a table, the existence of one or more foreign keys or a composite key is discovered, the instructions comprising generation component 204A-1 can be executed to cause processor 206A to associate or categorize that table with or as a fact table. Columns of a fact table comprise the facts (or measures). It should be understood that a fact table is a table that stores attribute values or measures (if the datatype is a number or some entity that is measurable), whereas a dimension table generally refers to a table that stores details about facts. Upon discovery of a foreign key, the instructions comprising generation component 204A-1, when executed, cause processor 206A to associate discovered facts and dimensions.

Further still, upon analyzing a table with a primary key and a foreign key, the instructions comprising generation component 204A-1 cause processor 206A to check some naming rules to identify facts columns. This is done to support correctly degenerated dimensions (i.e., when descriptive information has been added to a fact table). That is, degenerated dimensions can refer to a data set in a fact table. Support for degenerated dimensions (i.e., cutting/pasting the same information associated with or to a fact instead of adding a foreign key to a table containing dimensions and referencing a value/data) can make interactions with information easier for users. Additionally, this can be done for historical reasons as well, e.g., no SQL schema design change is needed.

The instructions comprising generation component 204A-1 when executed, further causes processor 206A to: ignore analysis of other types of tables unless a customized rule (described below) applies to a non-dimension/non-fact table; and treat a table without any primary or foreign key(s) as a dimension table (e.g., if a comma-separated-value file is injected as a table, where customization rules likely detail facts (in columns)). Moreover, the instructions comprising generation component 204A-1, when executed, cause processor 206A to use metadata (type, description, etc.) represented as column information in a table to complete a value pack definition or abstraction of a table. As will be described below, processor 206A may be caused to enrich the metadata in accordance with one or more customization rules.

Figure 3A:
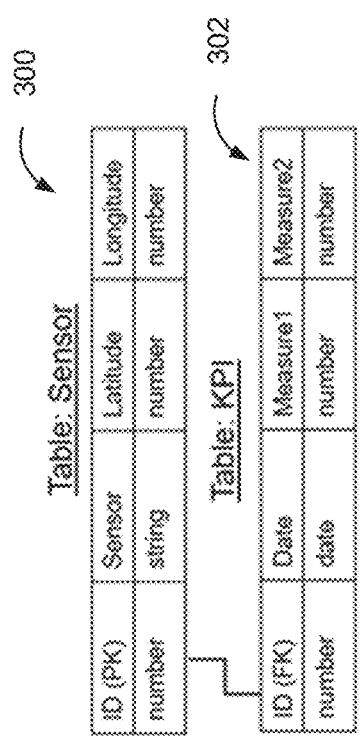

FIGS. 3A, 3B, 3C, and 3D illustrate examples database tables and the generation of dimension and fact tables in accordance with various embodiments. FIG. 3A illustrates a sensor table 300 and a key performance indicator (KPI) table 302. In some embodiments, the analysis comprises at least reading the name of each table, and determining the existence of keys. The sensor table 300, upon being analyzed by generation component 204A-1, is categorized as a dimension table, having a primary key (the ID number of the sensor), along with the following dimensions: sensor (string data); latitude (numerical value); and longitude (numerical value). Generation component 204A-1 further organizes any dimension tables, in this case, sensor table 300, into a dimension tree, where folders refer to table names, each folder containing the fields of the table. The KPI table 302, upon being analyzed by generation component 204A-1, is categorized as a fact table, where the ID (numerical value) identified in KPI table 302 is deemed to be a foreign key (as it links or associates KPI table 302 with sensor table 300). The columns of KPI table 302 correspond to facts/measures, i.e., date (storing date data), measure1 (storing a numerical value), measure 2 (storing a numerical value). Fact tables, e.g., KPI table 302 is analyzed as well to ascertain any fact values which are also organized into a fact folder, e.g., measures that can be displayed. The data is now sorted. It should be noted that generating dimension and fact tables establishes or identifies the relationship between a particular sensor and facts/measurements associated with that sensor. In this way, a view designer can be ensured that queries to a data source comprising these tables are consistent while building dashboard screens for presentation through a unified OSS console, e.g., unified OSS console 206.

Figure 3B:
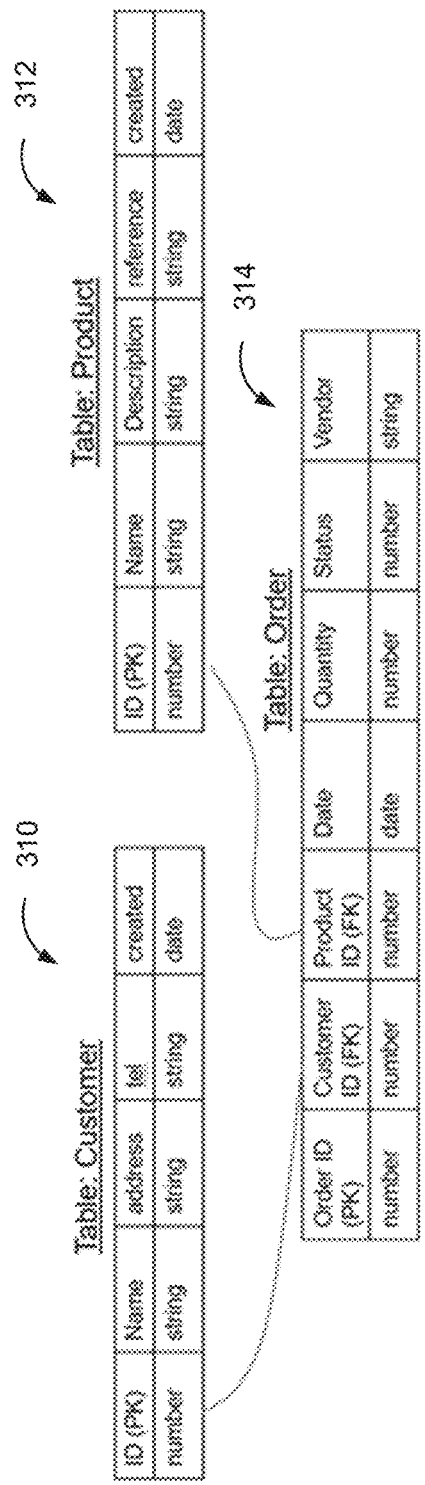

FIG. 3B illustrates an example customer table 310, an example product table 312, and an example order table 314. Customer table 310 and product table 312, upon analysis by generation component 204A-1, may be deemed dimension tables based on the ID primary key of customer table 310 and the ID primary key of product table 312. Order table 314 may be designated a fact table due to the presence of the customer ID and product ID foreign keys that link order table 314 to customer table 310 and product table 312. As alluded to above, the vendor column of order table 314 with a string datatype can be considered a degenerated dimension (a string is treated as additional description information), whereas the remaining columns of order table 314 are facts with number/date datatype values stored therein.

FIG. 3C illustrates an example antenna table 320, that based on primary key corresponding to an antenna ID (number datatype), will be categorized as or associated to a dimension table. Generation component 204A-1 comprises instructions that when executed, cause processor 206 to generate facts based on an assumption that the relevant generation rules (described below in greater detail) have been set to identify facts columns in a table with a particular naming convention. Here, antenna table 320 is configured with columns named "measure1" and "measure2" that can be assumed (set via a rule(s)) to be facts. Thus, generation component 204A-1 will ultimately generate an antenna dimension table with name, latitude, and longitude dimensions, and an antenna fact table with measure1 and measure2 facts, thereby correlating identified antennas having a particular name, longitude, and latitude with antenna-relevant measurements.

FIG. 3D illustrates example sensor table 330, example building table 332, and example KPI table 334. Here, customization rules may be used (described below) to join sensor table 330 and building table 332 into a single dimension table named "sensor," and having the following dimensions: ID; sensor; type; building ID (subsequent to renaming of the ID column of building table 332); building name (subsequent to renaming of the name column of building table 332); latitude, and longitude. That is, processor 206, upon executing the instructions comprising generation component 204A-1, will be caused to join sensor table 330 and building table 332 in accordance with a join generation rule specified by customization component 204A-2. A fact table named KPI will also be generated by generation component 204A-1 having the following facts: measure1; measure2; and date.

Generation component 204A-1 of SQL plugin 204A may further effectuate object and operation modeling when executed. That is, generation component 204A-1, when executed, generates objects from all the resulting dimension tables, and generates operations (e.g., create, read, update, delete operations) that can be performed on the generated objects. It should be noted that the create, read, update, and delete operations may be generated as default operations, but less operations or other operations may be generated as well.

In particular, instructions comprising generation component 204A-1, when executed, cause processor 206A to specify, designate, associate, or otherwise set any table identified as a dimension to be an object. Processor 206A may further specify, designate, associate, or otherwise set all columns of that table to be object attributes. That is, an object can refer to a group of dimensions defined in the same SQL table (one attribute of the object per dimension). Generally, a dimension or fact table comprises columns of dimensions or facts. For example, referring back to FIG. 3A, sensor table 300 comprises an ID column identifying each subject sensor with each subject sensor's dimensions (sensor, latitude, longitude) being reflected in a single row. Thus, a dimension or fact table is graphically similar to a table with multiple rows (corresponding in the example of FIG. 3A, to each identified sensor). Similarly, when representing an object, a single JSON file can be used to describe the object, where each dimension is treated as an attribute of the object. By default, generation component 204A-1 defines create, read, update, and delete operations, but may further define other operations, such as ticket creation, operations regarding alarm lifecycle management, etc. It should be noted that without any particular configuration specified in the generation rules, all dimension tables will be defined/generated as an object in the value pack to provide access to defined/generated objects. Exception rules may also be applied, wherein generation component 204A-1 may not generate certain objects/rules, e.g., based on exception rules instructing against defining one or more default operations, e.g., the delete operation, or generating a non-default operation, e.g., a lock/unlock operation.

Objects are defined and listed in the value pack associated with their supported operations, but details of an object have a separate JSON definition (object/version with all its attributes). The defined operations in a GUI rely on forms that have been designed to let an end user enter information and submit the operation (to the plugin in charge of propagating the change to the data server. In this case, the operation(s) are submitted to SQL plugin 204A that propagates the change per the operation at data source 204). It should be noted that in some embodiments, pre-defined HTML forms will be generated as part of the value pack. Using GUI editor 210, such pre-defined HTML forms may be customized.

Customization component 204A-2 of SQL plugin 204A may, when executed, allow users to specify exception, generation, and enrichment rules that can be applied to a default value pack generated by the generation component, such as filtering the value pack table, specifying desired cardinality, etc. That is, customization component 204A-2 may be considered to be closely linked to generation component 204A-1, as customization component 204A-2 comprises instructions that when executed by processor 206 manage rules that impact default value pack generation per value pack. It should be understood that in some embodiments, one value pack is generated per data source or database in the data source by default, but this can vary. As alluded to above, a dimension table can be either an object or a folder of dimensions whereas a fact table can be a folder of facts, and cannot be an object. It should be noted that customization component 204A-2 may be executed by processor 206A as needed or periodically or aperiodically to account for any desired customized generation vis-à-vis generation component 204A-1.

As alluded to above, a user may input or specify enrichment rules in customization component 204A-2 that act, e.g., as filters to select a particular database, tables of a database, as well as columns in a table to consider for value pack generation. That is, a user may specify a certain naming convection to identify dimension and fact tables, as well as filter rules (both using regular expressions), which may be input into unified OSS console 206A by way of customization component 204A-2. It should be noted that any manual definitions of metadata can override any default generation. It should also be understood that a regular expression can refer to a search pattern defined using characters, a raw value can be compared with the regular expression, and if a match exists, customization component 204A-2 can apply the desired customizations. For example, in the case of a filtering customization, an "ignore" rule when applied by customization component 204A-2, can result in the ignoring (not presenting/not making available for interaction) of any table matching the criteria of the ignore rule. Thus, generation component 204A-1 will exclude the ignored table(s) when generating a value pack. Additionally, a user may specify, and customization component 204A-2 can support, generation rules to force a specific type of generation for tables (dimension or fact tables), a specific generation for columns (dimension or fact columns), specifying low/high cardinality of occurrences, etc. Specifically regarding cardinality, there may be instances where a user wishes to present a select amount of information. For example, in the context of alarms being monitored, a user may wish to only have critical alarms presented. Specifying a desired cardinality can allow a user to control how much information within a data source is presented, made available to be queried, etc. As another example, hybrid tables with both dimensions and facts aspects may be subjected to generation rules to properly split identified dimensions and/or facts. In one embodiment, by default, a set of naming rules (based on regular expressions) to ease the split can be specified based on the name of a table column (e.g., *count, kpi*, NbOf*, etc.). Moreover, during the generation of a dimension table by generation component 204A-1, generation component 204A-1 can check for the number of distinct values of primary keys/dimensions. If the number of distinct values reaches a threshold limit set forth in customization component 204A-2, high cardinality may be assumed, and a corresponding GUI can present, e.g., as a checkbox, the option to lower cardinality.

As also alluded to above, one or more enrichment rules can be specified and applied by customization component 204A-2 to generate tables to complete their default generation. Enrichment rules can be used to specify any information that is missing from the metadata that help generate a user-friendly value pack, manage custom presentation names, descriptions, unit, sorting (best to worst, worst to best), etc. It should be understood that generally, the SQL table schema does not integrate all the information a user may need to see/interact with via a GUI. For example, certain data may be numerical data that lacks an associated unit, e.g., a column may have certain values/numbers. A user may utilize customization component 204A-2 to specify a unit to associate with the values/numbers to give those values/numbers meaning in a particular context.

Aggregation component 204A-3 of SQL plugin 204A may, when executed, allow additional table columns to be generated, where the additional table columns are defined as facts in the value pack, and exposed to the web GUI framework for requests. That is, a user may specify a desire to add extra columns in a value pack definition of one or more tables of data source 204, the extra columns being based on an aggregation function, e.g., count, max, min, sum, average, percentage, etc.) Aggregation component 204A-3, based on what the user specifies can define the resulting, extra columns as facts in the value pack, and expose the extra columns to any developed GUI to be queried in response to any requests. It should be understood that such columns are virtual, and aggregation component 204A-3 may compute the data to be presented on the fly/in real-time. For example, the specification of a minimum and maximum allows a specific range of values to be drawn with a dotted line in a chart. In some embodiments, instead of user-specified aggregation functions, facts columns may be automatically generated to reflect certain information, e.g., the number of facts in a table, the maximum number of facts in a table, the minimum number of facts in a table, etc. For example, and referring back to FIG. 3A, the variation between values corresponding to the measure1 and measure2 fact columns can be used to generate a new column, named "measure3" which need not be stored as a value, but can be computed during a query to determine the variation between the "measure1" and "measure2" facts.

Query component 204A-4 of SQL plugin 204A may, when executed, allow users to develop a desired view(s) of data based on a generated value pack that can be used to query the SQL database to return data comporting with the desired view(s). Query component 204A-4 may reuse a dimension/fact/object/operation request, and convert it to an SQL format, i.e., the original format (of an actual/"physical" table which is maintained in the SQL database). Query component 204A-4 may perform the query on data source 204, and return formatted data as output from computing device(s) 208A, 208B. An example "flow" of a query can be as follows: a logical model query (based on value pack) is converted into a physical table query (SQL-formatted query); the result(s) of the physical table query is formatted in accordance with the unified format for presentation to a user. In particular, query component 204A-4, when executed, controls solving a request received from a user utilizing, e.g., computing device 208A, on which one or more GUIs based on data source 204 are presented. For example, a user may wish to query data source 204 for some information, in particular, data associated with a fact F of dimensions D1 and D2. Query component 204A-4, when executed, and upon receipt of the query, converts the query request (e.g., from URL format) to an SQL-formatted query on the actual data source 204. By virtue of the value pack definition of data source 204 that was generated by SQL plugin 204A, the logical layer can be exposed to unified OSS console 206 while maintaining any mapping to physical data source 204 to properly perform the requested query. In other words, SQL plugin 204A follows "standard" unified OSS console 206 guidelines for converting the query request (i.e., GUI request) based on the logical model provided by the value pack, and the physical model of the data source.

Cache component 204A-5 of SQL plugin 204A may, when executed, allow generated value packs to be saved and loaded upon subsequent startup of the unified OSS console 206. That is, after unified OSS console 206 starts up, any value packs generated by generation component 204A-1 are saved in a client/user public directory, ready to be loaded at the next restart/start of unified OSS console 206.

Documentation component 204A-6 of SQL plugin 204A may, when executed, generate documentation regarding a generated value pack beyond a JSON file. That is, processor 206A may be caused by execution of instructions making up documentation component 204A-6 to communicate with generation component 204A-1 to identify any generated value packs. Alternatively, upon starting up unified OSS console 206, documentation component 204A-6 may determine value packs that are loaded or exposed. Upon identifying the value packs, documentation component 204A-6 will analyze each value pack to identify its characteristics, e.g., whether it is a dimension table, a fact table, the relevant information regarding its dimension(s), fact(s), its associated operations and objects, etc. Document component 204A-6 may generate a skeleton or shell document (based on a markdown format) that details any known information/characteristics of the value pack, e.g., folders, names, identifiers, facts, units, any objects or operations that have been generated, etc. Any further description fields can be completed by a user, e.g., integrator in charge of a value pack. Generally, documentation component 204A-6 can reflect any work done regarding data source integration, and value pack generation/customization. In some embodiments, the format of a resulting output document can be formatted to effectuate an exchange/discussion with users or customers. It should be noted that such documentation is likely more easily understood by users, e.g., versus a JSON file.

Self-monitoring component 204A-7 of SQL plugin 204A may, when executed, expose SQL plugin 204A to unified OSS console 206 in order to allow unified OSS console 206 to monitor the health/performance of SQL plugin 204A itself. In particular, SQL plugin 204A will follow the standard unified OSS console 206 guidelines to expose its own health status to unified OSS console 206. Self-monitoring component 204A-7 may be an API, e.g., REST API implemented by SQL plugin 204A, that can be called by unified OSS console 206 per plugin instance to check its health periodically, for example, every N amount of time. In some embodiments, self-monitoring component 204A-7 checks "mandatory" components or elements of unified OSS console 206. For example, when called, self-monitoring component 204A-7 can monitor status of a host on which unified OSS console 206 may be operating, state of any connected/integrated data source, poll requests, any useful KPI of a table(s), etc. Self-monitoring component 204A-7 may then return a summary of the status of these components/elements, along with a description of the same. If some status is bad or non-optimal or falls outside of some desired operating threshold, a warning, alarm, or other notification can be generated and sent to a user via one or more of computing devices 208A, 208B.

Figure 4A:
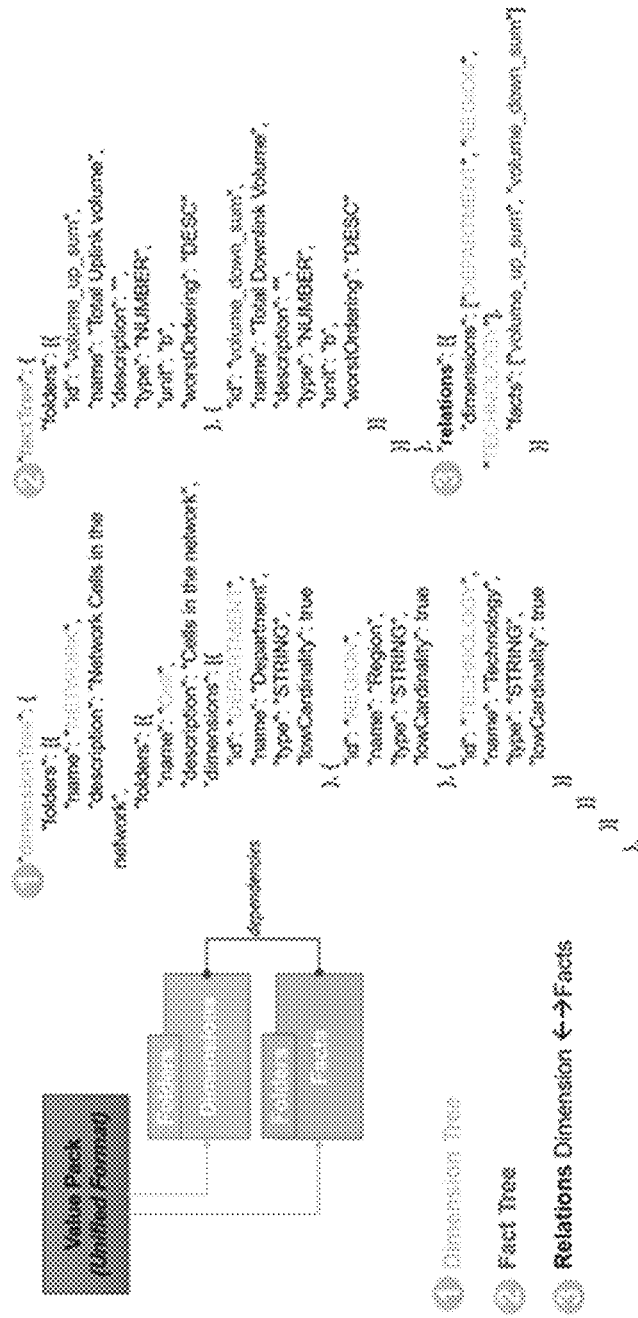
FIGS. 4A and 4B illustrate example value-pack definitions of SQL database tables in accordance with one embodiment of the present disclosure.

FIG. 4A illustrates the dimensions and facts 400 associated with an example value pack logical model generated in accordance with one embodiment of the present disclosure. As illustrated in FIG. 4A, a dimension tree can be organized by folders (and sub-folders), and describes the list of available dimensions, e.g., criteria of analysis to obtain metrics), while a fact tree can also be organized by folder, and describes all the metrics associated with dimensions. The relations aspect of the example value pack logical model can describe any association(s) between dimension(s) (from the dimension tree) and fact(s) (from the tact tree). Relations information can be useful to providing an intelligent analytics tool that shows/hides dimensions and/or facts as needed in a consistent way that avoids invalid data source queries.

Figure 4B:
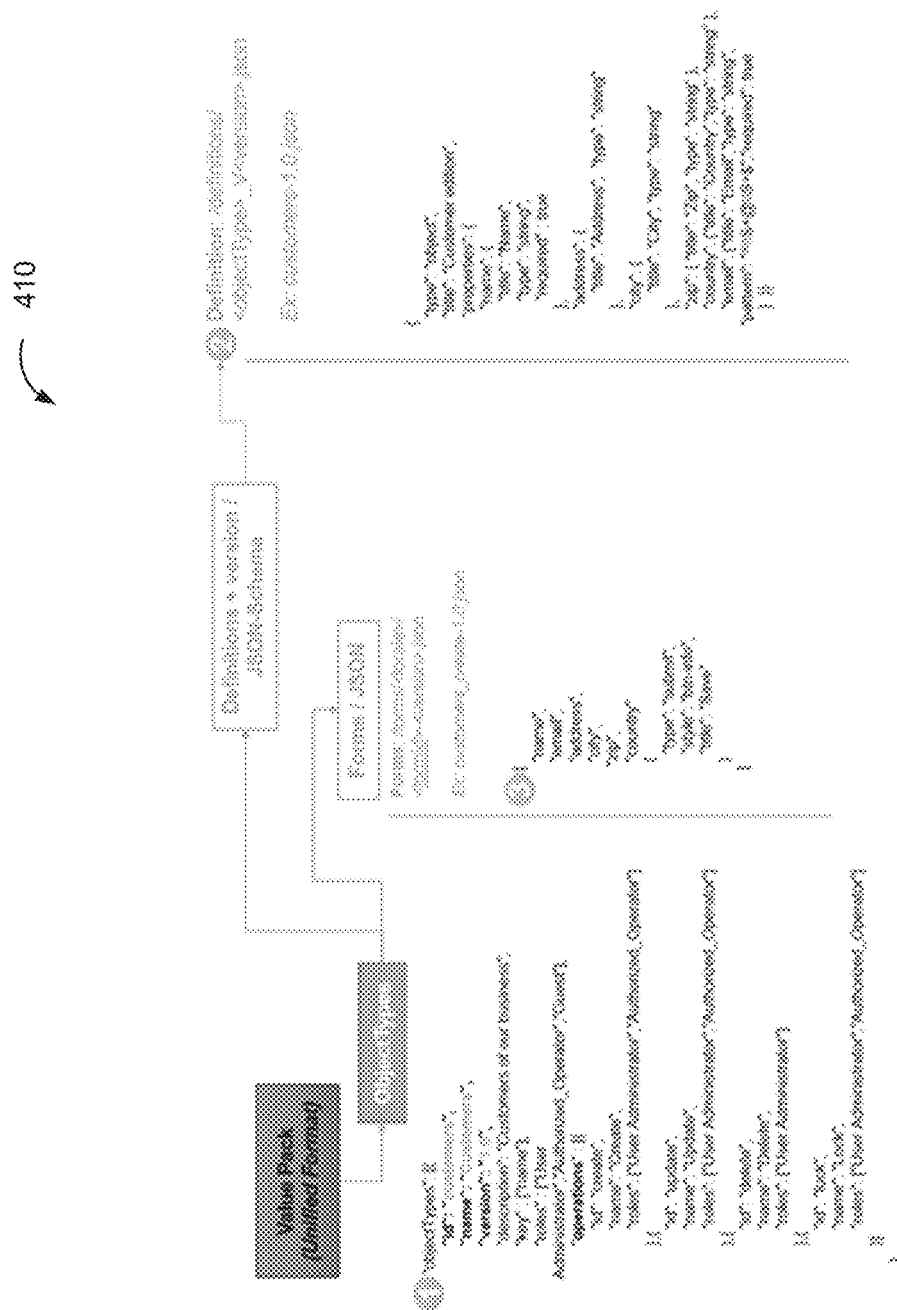

FIG. 4B illustrates objects 410 generated from the dimensions of the example value pack logical model of FIG. 4A. It should be noted that it is possible to define multiple objects in a value pack (e.g., by identifier, name, and version), and associate security rules to those objects for access thereto. An object's definition can be based on a JSON-schema definition where all attributes can be defined as well as the operations on those objects. An object can have one or more GUI form definitions, indicating to the unified OSS console 206 how to display/request information. The defined objects and associated operations can be described in a value pack, and may also be protected by the specification of roles (that users may have) allowed to access an operation(s). A JSON file can store a description of each object and their respective properties, e.g., name, requirements, type, etc. To perform operations using a form, a JSON file can be used to store the description of objects and properties that can be displayed to a user, and when forms are used in, e.g., a search, creation, or update operation, defined messages can be displayed in a JSON validator, and messages can be customized/localized. The presentation of graphs can also be effectuated by a JSON file that describes how an object(s) and its properties will be displayed to a user, where a graph can be a set of graphical styles used to associate nodes and link attributes of objects.

Figure 5:
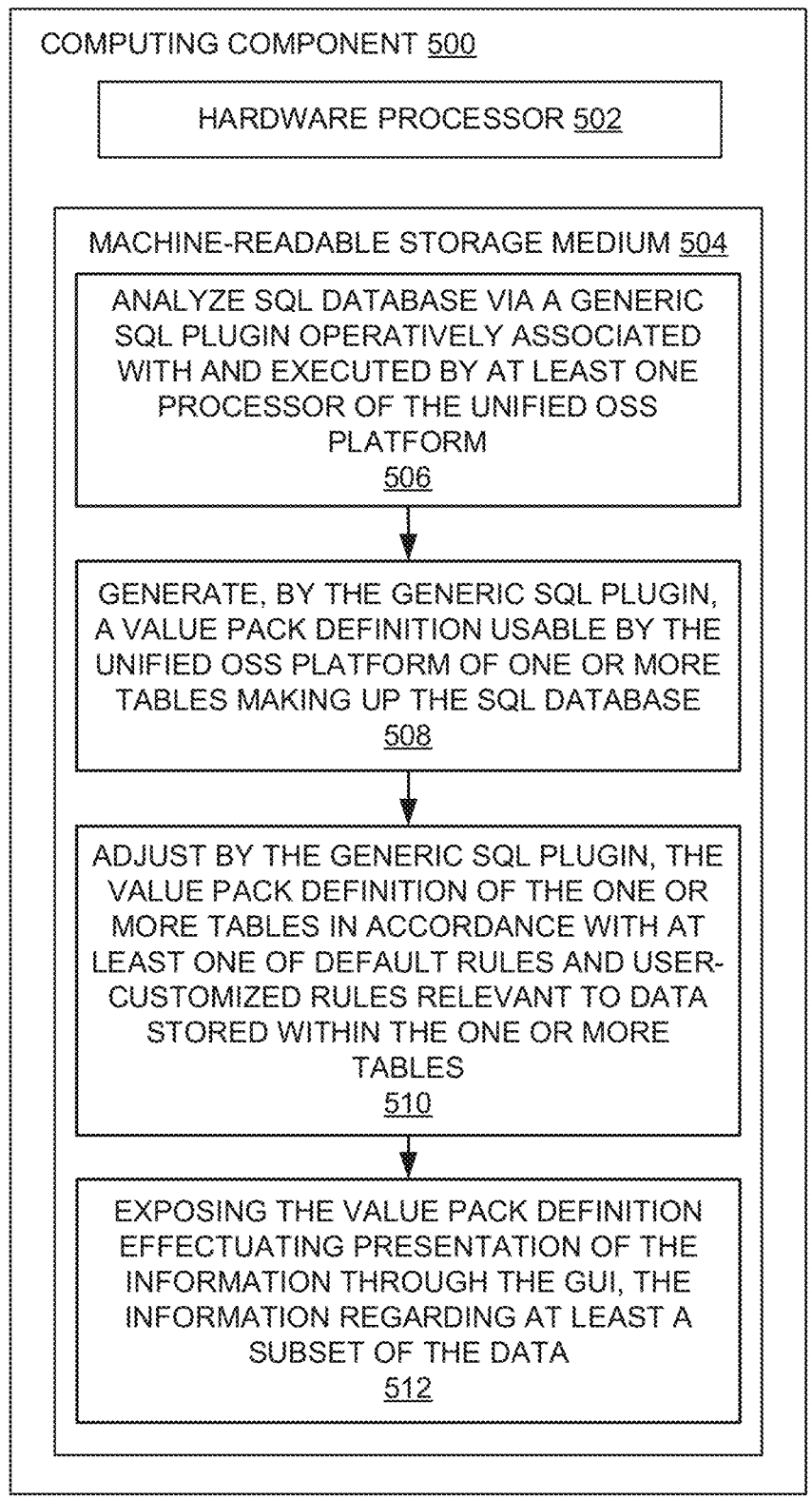
FIG. 5 is a flowchart illustrating example operations performed by the unified OSS console and SQL plugin of FIG. 2A to automatically generate a value pack definition of tables in a data source in accordance with one embodiment.

FIG. 5 is a block diagram of an example computing component or device 500, which may be an embodiment of unified OSS console 206, for automatically generating a value pack for exposure to unified OSS console 206. In the example implementation of FIG. 5, the computing component 500 includes a hardware processor 502, which may be an embodiment of processor 206A, and machine-readable storage medium 504, which may be an embodiment of memory unit 206D.

Hardware processor 502 may be one or more central processing units (CPUs), semiconductor-based microprocessors, and/or other hardware devices suitable for retrieval and execution of instructions stored in machine-readable storage medium, 504. Hardware processor 502 may fetch, decode, and execute instructions, such as instructions 506-512, to control processes or operations for initially setting up a network switch. As an alternative or in addition to retrieving and executing instructions, hardware processor 502 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 504, may be any electronic, magnetic, optical, or other physical storage device that contains or stores executable instructions. Thus, machine-readable storage medium 504 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 504 may be a non-transitory storage medium, where the term "non-transitory" does not encompass transitory propagating signals. As described in detail below, machine-readable storage medium 504 may be encoded with executable instructions, for example, instructions 506-512. Depending on the implementation, the instructions may include additional, fewer, or alternative instructions, and may be performed in various orders or in parallel.

Hardware processor 502 may execute instruction 506 to analyze an SQL database via a generic SQL plugin operatively associated with a unified OSS platform. As noted above, a generation component of an SQL plugin, e.g., generation component 204A-1 of SQL plugin 204A may determine the existence of any primary keys, foreign keys, or some combination thereof. This determination of keys may be used as a basis for generating abstractions of database tables, e.g., tables in data source 204, in terms of dimensions, facts, objects, operations, and/or forms.

Hardware processor 502 may execute instruction 508 to generate, by the generic SQL plugin, a value pack definition usable by the unified OSS platform, of one or more tables making up the SQL database. That is, taken together, the above-mentioned abstractions can be generated by generation component 204A-1 and saved, e.g., by cache component 204A-5, as a value pack definition (of the data source/tables in the data source). Operation of the unified OSS console 206 is predicated on the use of value pack abstractions of data sources such that heterogeneous data sources and/or data can be normalized allowing unified OSS console 206 to access, represent, and/or query the data.

Hardware processor 502 may execute instruction 510 to adjust, by the generic SQL plugin, the value pack definition of the one or more tables in accordance with at least one of default rules and user-customized rules relevant to data stored within the one or more tables. The value pack abstractions or definitions may be customized in accordance with one or more exception, enrichment, and/or generation rules specified by a user(s) or in accordance with default settings. Such rules may allow data in data source 204 (the tables of which have been abstracted into value packs) to be exposed to unified OSS console 206 allowing operations to be performed on the data, allowing users to query the data source 204, allowing data to be presented, etc. in particular, desired ways and/or in ways appropriate for the data at issue.

Hardware processor 502 may execute instruction 512 to expose, by the generic SQL plugin, the value pack definition of the one or more tables effectuating presentation of the information regarding at least a subset of information in an SQL database through the GUI. As described above, a GUI editor, such as GUI editor 210 may be used to develop dashboards, views, forms, reports, and/or other representations of data or information related to data maintained in a data source, such as data source 204. Development of such GUIs and/or GUI representations are based off of the value pack definitions or abstractions defined by the SQL plugin 204A.

FIG. 6A illustrates an example data selection GUI 600 that, based on value pack definitions or abstractions of data sources, allows dimensions, facts, objects, etc. to be organized with folders, for example, to ease selection. Data selection GUI 600, for example, allows for the selection of dimensions exposed to unified OSS console 206, facts (or measures), as well as objects, operations, and forms. Organization by folder and considering dimension/fact relationships (as discussed above), allow such relationships to be consistently maintained.

Figure 6B:
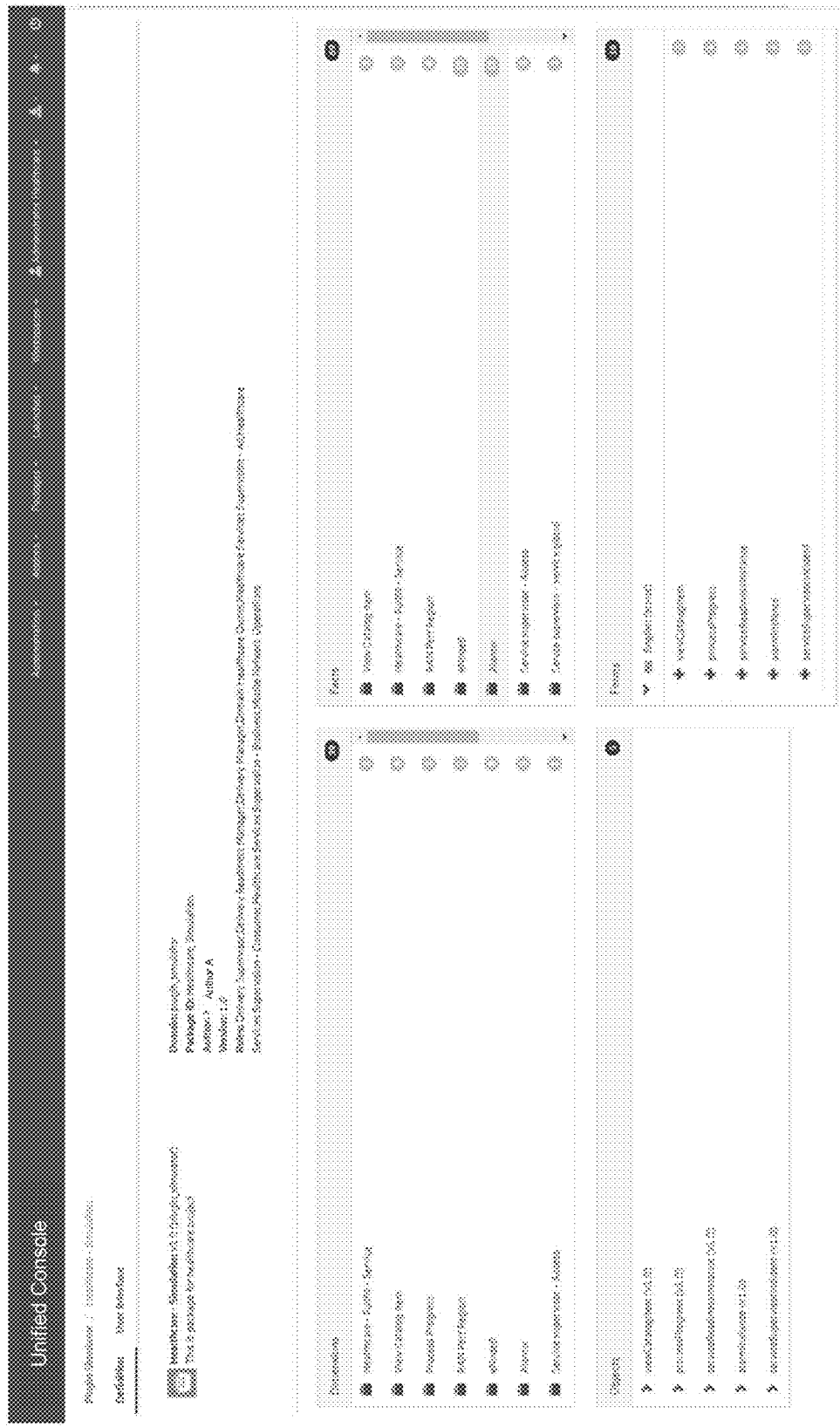
FIG. 6B is an example screenshot of an example unified OSS console browser view of a value-pack defined table in accordance with one embodiment of the present disclosure.
Figure 6C:
FIG. 6C is an example screenshot of an example unified OSS console dashboard generated and presented in accordance with one embodiment of the present disclosure.

FIG. 6B illustrates an example value pack browser GUI 610 that presents all the exposed value pack information to a user. That is, value pack browser GUI 610 presents dimensions, facts, objects, and forms that have been generated by SQL plugin 204A based on the tables resident in data source 204. Again, these aspects of the value pack can be organized by folder for ease of use by the end user. That is, the value pack can be served and used as a unified format for designing GUIs and querying the data source. It can also allow for "mashups" with other value packs/value pack data, as well as contain any mappings to the data source so as to allow for proper SQL queries to be performed via unified OSS console 206, e.g., a dashboard GUI view presented by way of unified OSS console 206.

FIG. 6C illustrates an example healthcare dashboard 620 associated with a particular value pack generated by SQL plugin 204A. As can be appreciated, information, statistics, etc. regarding the data or the data itself can be presented via one or more GUI elements of the example healthcare dashboard 620. Such information and/or data can be presented using graphical elements, textual elements, or some combination thereof. Different aspects or sets of information may be selected and presented based on the value pack or aspects of the value pack exposed to unified OSS console 206.

Various embodiments disclosed herein provide mechanisms for generating value pack models, definitions, or abstractions of data maintained in a data source through relational tables in real-time or non-real-time. Various embodiments can reduce the workload and cost associated with data presentation and data source access, especially in the context of prototyping graphical dashboards with customer data maintained in CSV files, for example.

Moreover, the unified OSS console "modelization" and value pack structure that allow for cross navigation amongst heterogenous data/data sources, and the sharing of data by way of a GUI application. Further still, the generic SQL plugin can be fully integrated into the unified OSS console or platform/product itself, and can be leveraged in minutes for rapid and agile GUI dashboard/presentation development, while still allowing for customization to support or work around, e.g., exotic or non-standard SQL modelization.

Figure 7:
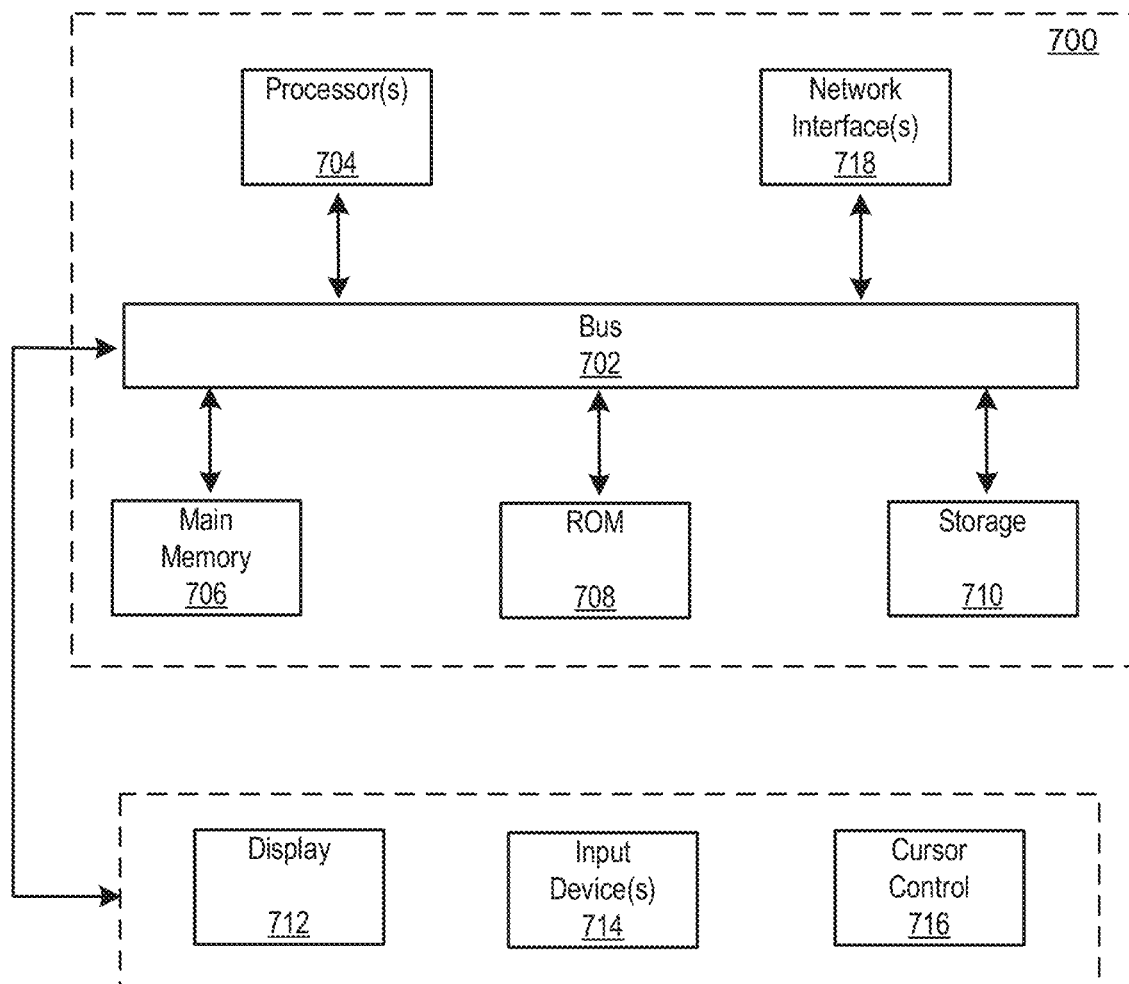
FIG. 7 is an example computing component that may be used to implement various features of embodiments described in the present disclosure.

FIG. 7 depicts a block diagram of an example computer system 700 in which embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, JavaScript, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes a network interface 718 coupled to bus 702. Network interface 718 provides a two-way data communication coupling to one or more network links that are connected to one or more local networks. For example, network interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or a WAN component to communicate with a WAN). Wireless links may also be implemented. In any such implementation, network interface 718 sends and receives electrical, electromagnetic or optical signals that carry digital data streams representing various types of information.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Terms and phrases used in this document, and variations thereof, unless otherwise expressly stated, should be construed as open ended as opposed to limiting. The presence of broadening words and phrases such as "one or more," "at least," "but not limited to" or other like phrases in some instances shall not be read to mean that the narrower case is intended or required in instances where such broadening phrases may be absent.

What is claimed is:

1. A method for presenting SQL database information through a graphical user interface (GUI) of a unified operations support system (OSS) platform, comprising:
    analyzing the SQL database via a generic SQL plugin operatively associated with and executed by at least one processor of the unified OSS platform;
    generating, by the generic SQL plugin, a value pack definition usable by the unified OSS platform, the value pack definition comprising the one or more tables making up the SQL database;
    adjusting, by the generic SQL plugin, the value pack definition in accordance with at least one rule relevant to data stored within the one or more tables; and
    exposing, by the general SQL plugin, the value pack definition of the one or more tables effectuating presentation of the information through the GUI, the information regarding at least a subset of the data.

2. The method of claim 1, wherein the analyzing of the SQL database comprises determining existence of at least one of a primary key and a foreign key in one or more tables making up the SQL database.

3. The method of claim 2, wherein the generating of the value pack definition comprises categorizing each of the one or more tables as at least one of a definition table and a fact table.

4. The method of claim 3, wherein the categorizing of each of the one or more tables is based on the existence of the at least one of the primary key and the foreign key in each of the one or more tables.

5. The method of claim 4, wherein the generating of the value pack definition comprises organizing each definition table into a dimension tree comprising folders corresponding to a name of each definition table and containing fields of a corresponding table of the one or more tables.

6. The method of claim 3, wherein the generating of the value-pack definition further comprises generating one or more objects from each of the one or more tables categorized as a definition table.

7. The method of claim 6, wherein the generating of the value-pack definition further comprises generating one or more operations performable on the one or more objects.

8. The method of claim 1, wherein the user-customized rules comprise enrichment rules applied to the value pack definition adjusted in accordance with the default rules.

9. The method of claim 8, wherein the enrichment rules comprise at least one of filtering rules and cardinality-specification rules.

10. The method of claim 1, further comprising storing the adjusted value pack definition of the one or more tables in a JavaScript Object Notation file in a public directory accessible by users of the unified OSS portal.

11. The method of claim 1, wherein the presented information comprises at least one dashboard view of the data, wherein the at least one dashboard view is created through a GUI editor based on the adjusted value pack definition of the one or more tables.

12. The method of claim 1, wherein the presented information comprises visualized representations indicative of health characteristics of the unified OSS console or metadata associated with the subset of the data.

13. The method of claim 1, further comprising providing, by the generic SQL plugin, documentation representative of characteristics of the value pack definition of the one or more tables.

14. The method of claim 1, further comprising, storing, by the generic SQL plugin, the value pack definition in a public directory accessible by a user of the unified OSS console.

15. The method of claim 1, further comprising building and converting, by the generic SQL plugin, at least one query to query the SQL database.

16. The method of claim 1, further comprising, creating, by the generic SQL plugin, at least one additional column into the value pack definition representative of at least one aggregation function applied to one or more columns of at least one of the one or more tables.

17. A unified operations support system (OSS) platform, comprising:
    a processor; and
    a memory unit operatively connected to the processor including computer code that when executed causes the processor to access a remote data source via an interface;
    a plugin, controlled by the processor and through which the interface requests and receives remote data source information, wherein the computer code, when executed, further causes the processor to control the plugin to:
        generate a logical model definition of remote data source tables making up the remote data source such that the remote data source tables are understandable by the unified OSS platform; and
        expose the logical model definition of the one or more remote data source tables to a graphical user interface (GUI) presented on a console operatively connected to the unified OSS platform to effectuate presentation of the remote data source information through the GUI, the remote data source information regarding at least a subset of data stored within the remote data source tables.

18. The unified OSS platform of claim 17, wherein the computer code, when executed, further causes the processor to control the plugin to:
- determine an existence of at least one of a primary key and a foreign key present in each of the remote data source tables in order to generate the logical model definition; and
- categorize each of the remote data source tables as at least one of a definition table and a fact table depending on the determined existence of the at least one of the primary key and the foreign key.

19. The unified OSS platform of claim 18, wherein the computer code, when executed, further causes the processor to control the plugin to generate one or more objects from each of the remote data source tables categorized as a definition table.

20. The unified OSS platform of claim 18, wherein the computer code, when executed, further causes the processor to control the plugin to convert a query comporting with the logical model definition from the GUI into a query comporting with an original format of the remote data source.

* * * * *